Patented Oct. 15, 1935

2,017,614

UNITED STATES PATENT OFFICE 2,017,614

PREPARATION OF MIXTURES OF HYDROCHLORIC, SULPHURIC, AND SULPHUROUS ACIDS

Artturi Ilmari Virtanen, Helsinki, Finland

No Drawing. Application June 28, 1933, Serial No. 678,102

1 Claim. (Cl. 23—139)

The transport and storing of strong mineral acids—especially of hydrochloric and sulphuric acids—will often cause considerable difficulties due to the corrosive properties of the said acids. Furthermore, technical hydrochloric acid contains about 70% of water, which makes its transport unduly costly. Acid-proof vessels for the transport of mineral acids are expensive and, especially as regards common glass carboys, easily broken during the transport. The material losses thus caused are further increased by the damage done to the transport vehicles. It is therefore of the greatest importance, that means be found for the transport and storing of mineral acids in a more concentrated and less dangerous form.

I have now found that in cases where diluted mixtures of sulphuric and hydrochloric acids are needed either as such or in conjunction with sulphurous acid, it is most advisable to prepare the acid solutions, immediately before use, from certain chemicals, the transport of which is comparatively safe and cheap. In this respect, compounds containing sulphur and chlorine, especially sulphuryl chloride and thionyl chloride, are best suited for the purpose. The said compounds will, in the presence of water, undergo hydrolysis, when sulphuric and hydrochloric acids are formed from sulphuryl chloride and hydrochloric acid and sulphurous acid from thionyl chloride.

The rate of hydrolysis of sulphuryl chloride is, however, comparatively slow at ordinary temperature—a fact which makes its practical use less advantageous. Thionyl chloride, on the other hand, is hydrolyzed almost momentarily.

It is known that the velocity of sulphuryl chloride hydrolysis can be accelerated by an addition of free acids. It is however, highly dangerous to prepare and transport mixtures of sulphuryl chloride with free acids. The separate transport of sulphuryl chloride and acids again is very tedious and involves considerable difficulties and expenses. The present invention obviates all these difficulties and makes it possible to produce dilute solutions of hydrochloric, sulphuric and sulphurous acids from preparations which can be transported fully safely and which will rapidly decompose in water without any further operations or admixtures being required for the purpose. I have found that thionyl chloride can be mixed with sulphuryl chloride and that this mixture can be transported safely. Furthermore, this mixture is readily decomposed in the presence of water, due to the acceleration of sulphuryl chloride hydrolysis by the acids formed on the momentary hydrolysis of thionyl chloride.

Since only small quantities of thionyl chloride are required to initiate and accelerate the hydrolysis of sulphuryl chloride it is possible by the new invention to prepare, if desired, dilute solutions of sulphuric and hydrochloric acids with only a negligible content of sulphurous acid. In certain cases, however, it is preferable to use an acid solution which has a somewhat higher content of sulphurous acid. The following example shows by way of illustration how the invention may be carried into practice. 120 grams of thionyl chloride are added to 10 kgs. of sulphuryl chloride. The mixture can be safely transported in metal vessels. When, for instance, about 3 N acid solutions are required, the mixture is dissolved in 100 litres of water.

I claim:—

A method for the preparation of dilute mixtures of hydrochloric, sulphuric and sulphurous acids, comprising hydrolyzing a mixture of sulphuryl chloride and thionyl chloride in the presence of excess water.

ARTTURI ILMARI VIRTANEN.